Oct. 22, 1957　　　A. M. MARKS　　　2,810,324
LIGHT POLARIZING ILLUMINATING DEVICE
Filed Dec. 2, 1954　　　　　　　　　3 Sheets-Sheet 1

INVENTOR.
ALVIN M. MARKS
BY Albert F. Kronman
HIS ATTORNEY

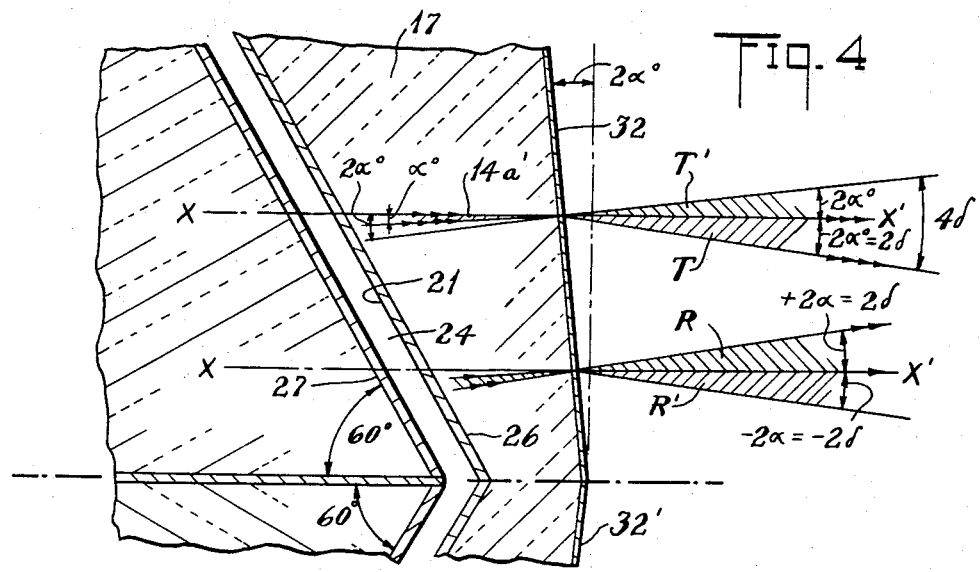
Fig. 4
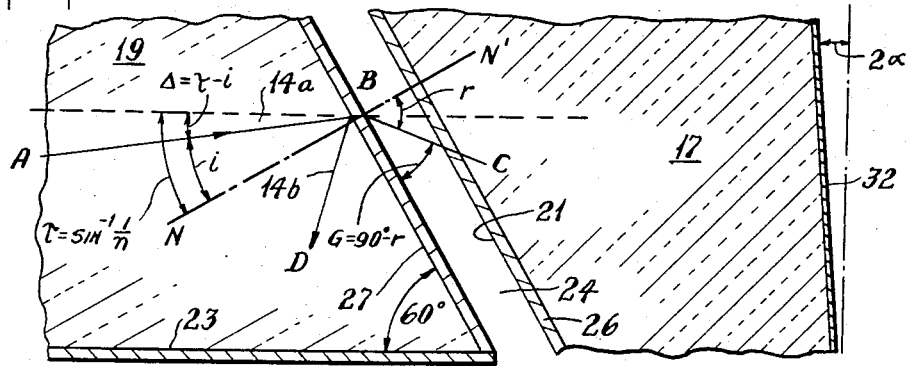
Fig. 5
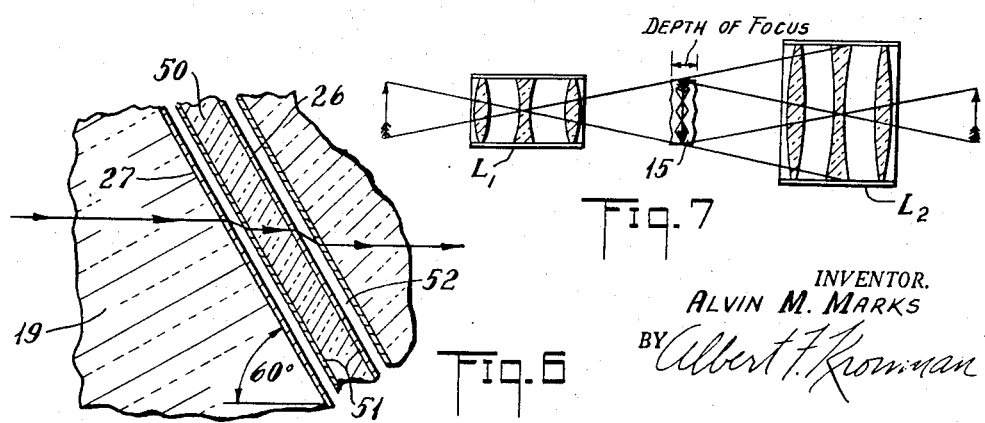
Fig. 6
Fig. 7
INVENTOR.
ALVIN M. MARKS
BY Albert F. Kronman
HIS ATTORNEY

United States Patent Office 2,810,324
Patented Oct. 22, 1957

2,810,324

LIGHT POLARIZING ILLUMINATING DEVICE

Alvin M. Marks, Beechhurst, N. Y., assignor to Marks Polarized Corporation, New York, N. Y., a corporation of New York Application December 2, 1954, Serial No. 472,739

15 Claims. (Cl. 88—65)

This invention relates to a high efficiency light polarizing device having application to approximately parallel beams of light such as those emitted by automobile headlights, motion picture projectors and the like.

In my earlier application for patent, filed November 14, 1952, Serial No. 320,440, there were disclosed various devices for the projection of polarized beams of light, having a utilization efficiency of approximately 80% of the incident light. Such structures were contrasted with formerly known linear polarizers, which transmit as polarized light only 30% to 45% of the initial light input. The present device is an improvement over my earlier application, in that a shorter, more compact polarizing device has been achieved with certain other advantages which will become apparent hereinafter.

It is an object of the present invention to provide a novel light polarizing device employing a multi-layer high index polarizing medium, incorporated into an optical structure which will transmit incident parallel light, and at the same time convert, and redirect the direction and the vibration components of the transmitted and the reflected light coming from the polarizing medium, into a substantially parallel beam of polarized light.

Another object of the present invention is to provide a high efficiency polarizing device which is suitable as a polarizing attachment for conventional automobile headlights or for incorporation as an integral part thereof.

Another object of the present invention is to provide a high efficiency polarizing device which will be inexpensive to manufacture.

A further object of the present invention is to provide a structure which will withstand the high temperatures and hard usage to which an automobile headlight polarizer may be put.

A still further object of the present invention is to so direct the polarized light emanating from the polarizer as to spread the beam only in the horizontal plane.

A feature of the present invention is its arrangement of prisms which permit of the use of the phenomena of total internal reflection from the surfaces of transparent mediums to redirect the reflected component of light approximately parallel to the transmitted components, and with the planes of polarization of the transmitted and reflected components parallel.

Another feature of the present invention is the multi-layer high index polarizing structure, which provides high polarizing efficiency within a very compact construction.

A further feature of the present device is its minimum number of parts.

A still further feature of the present device is its use of materials which will withstand deterioration due to high ambient temperatures, vibration, exposure to the elements, etc.

A further feature of the present device is its half-wave plate structure whereby the plane of polarization of the reflected component may be rotated to correspond with that of the transmitted component of the light beam.

The invention consists of the construction, combination and arrangement of parts, as herein illustrated, described and claimed.

In the accompanying drawings, forming a part hereof are illustrated two forms of embodiment of the invention, in which drawings similar reference characters designate corresponding parts, and in which:

Figure 4 is a fragmentary view of the light polarizing interfaces somewhat enlarged in accordance with the present invention, showing in detail the behavior of transmitted and refluxed rays at the exit face of the polarizer.

Figure 5 is a fragmentary view similar to Figure 4 showing the various relationships within the air space between the polarizing layers.

Figure 6 is a fragmentary vertical sectional view similar to Figure 4, showing the light polarizing interfaces of one of the prisms of a second embodiment of the present invention.

Figure 7 is a somewhat diagrammatic view of a light polarizing device according to the present invention incorporated into an image projection system.

Figure 1:
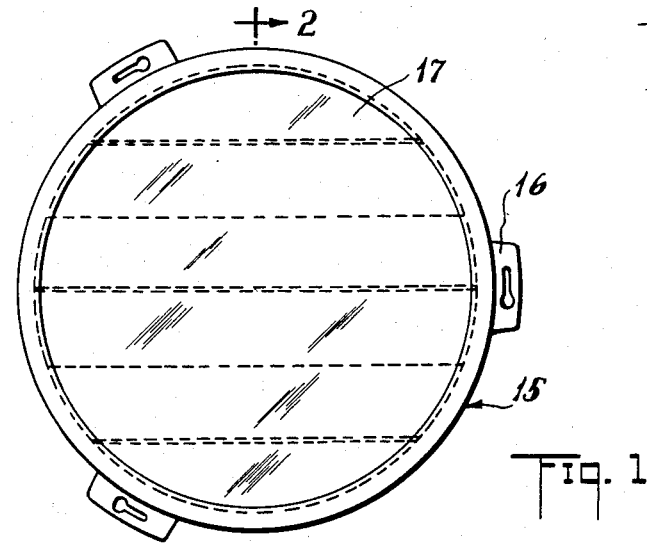
Figure 1 is a view in front elevation showing one complete embodiment of the present invention applied to an automobile headlight.

In the drawings, the plane of polarization is indicated as the old convention in which the magnetic vector of the polarized beam is defined as coinciding with its plane of polarization.

Referring to the drawings, and particularly to Figures 1, 2, and 3, 10 indicates a source of parallel light beams which may be, for example, the sealed beam headlamp of an automobile. Light from the headlamp filament 11, generally indicated at 12, is caused to impinge upon a reflector 13, which converts the light into a substantially parallel beam, one bundle of rays of which is indicated at 14 in Figures 2 and 3. The rays 14 are directed forwardly of the reflector 13 into a polarizing device, generally indicated at 15 in Figures 1 and 2. The polarizing device 15 may be secured to the source of parallel light by a suitable shell 16, or may be manufactured as an integral part of the said light.

The polarizing device 15, broadly speaking, comprises a front prism plate 17, a rear prism plate 18, and a plurality of prism blocks 19 and 20, interposed between said plates 17 and 18. The prism plates 17 and 18 are preferably made of glass or transparent plastic having any suitable index of refraction. An index of refraction of 2.00 has been chosen by way of an example. The plate 17 is provided with a series of prism surfaces 21 on the inner face thereof. The prism plate 18 is provided with an opposed series of prism surfaces 22 on the forward face thereof. Thus, when the plates 17 and 18 are mounted in the shell 16 they leave between them a series of openings each having a somewhat diamond shaped cross-section.

The prism blocks 19 and 20, which lie between the prism plates 17 and 18 comprise a plurality of elongated members having a substantially triangular cross-section. These blocks 19 and 20, are preferably made of glass, which, in the chosen example, preferably have the same index of refraction as the prism plates 17 and 18; namely, 2.00. For this index of refraction all rays directed at a surface at an angle of incidence greater than 30° are totally reflected. The importance of the proper choice of material for the proper utilization of the phenomena of total internal reflection will hereinafter become more fully apparent.

The prism blocks 19 and 20 which are disposed within the diamond shaped openings between the prism plates 17 and 18 are formed into a series of composite elements comprising the two prism blocks 19 and 20 and a suitable half-wave retardation plate 23 therebetween. The three elements are laminated together with the half-wave plate 23 between the prism blocks 19 and 20 so that there is no air space between the laminated surfaces of the prism blocks 19 and 20 and the half-wave plate 23. This lamination prevents loss of light by reflection.

By the term half-wave plate there is meant a plate which has a suitable birefringence such that incident polarized light has its plane of polarization rotated through 90° upon passing therethrough (at the angle of 60° to the surface of the half-wave plate in this example). Such half-wave plates may be in the form of a sheet of mica of appropriate thickness or a stretched birefringent plastic, manufactured according to presently known methods.

Figure 2:
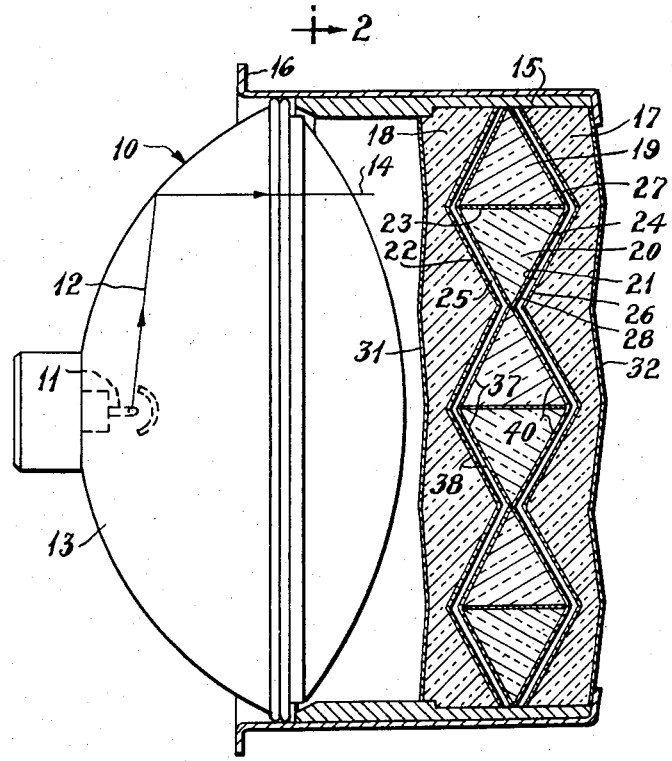
Figure 2 is a vertical section taken on line 2—2 in Figure 1 looking in the direction of the arrows.
Figure 3:
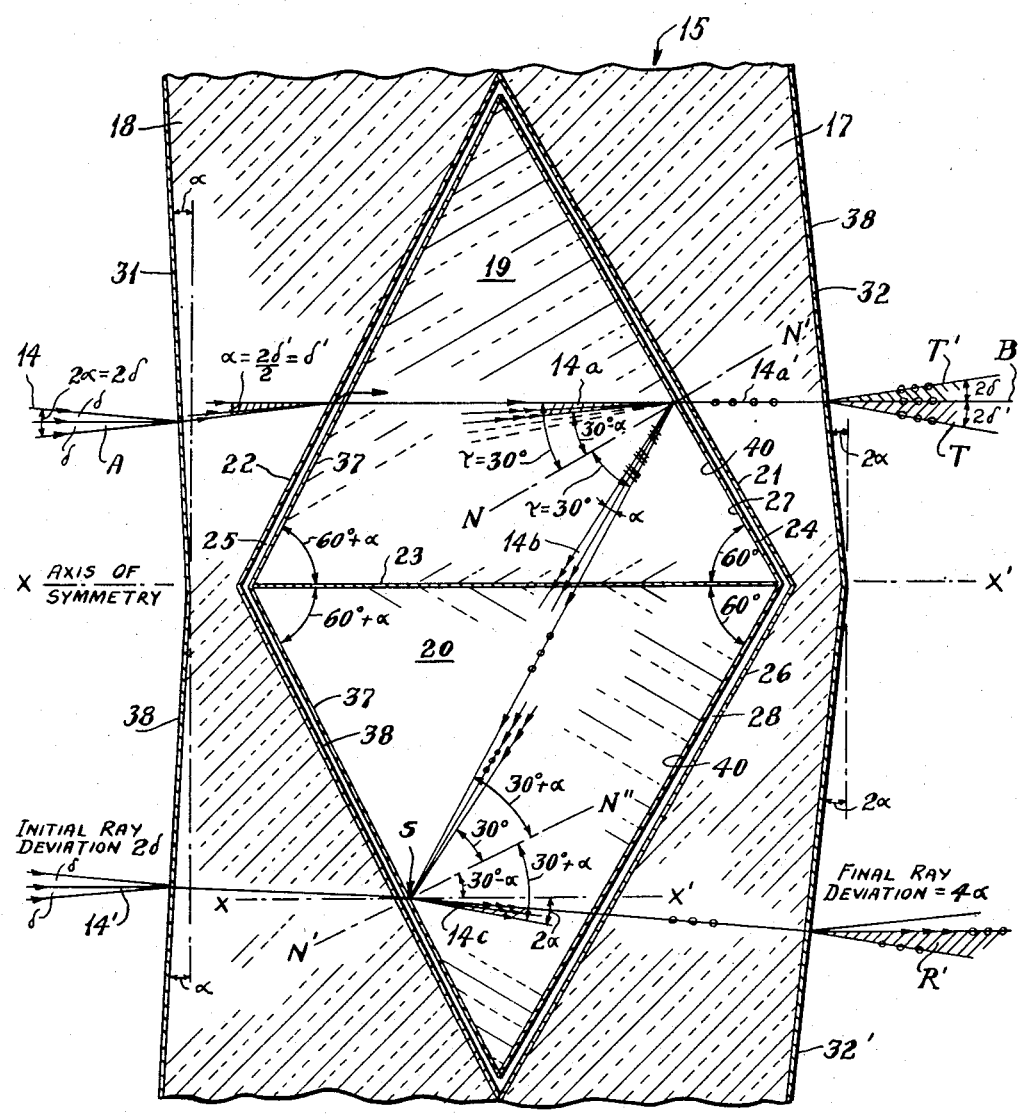
Figure 3 is a fragmentary view, greatly enlarged, showing one of the prisms illustrated in Figure 2.

Referring specifically to Figures 2, 3 and 4, it will be seen that the front prism plate 17 and the rear prism plate 18 are separated from the prism blocks 19 and 20 by air spaces 24 and 25. The prism blocks are supported in this position at their ends by the shell member 16. The inner surface 21 of the prism plate 17 is provided with a quarter-wave coating 26 of titanium dioxide. A similar coating is provided on those faces of the prism blocks 19 and 20, which lie closest to the coated surfaces 21 of the front prism plate 17. The coated surfaces of the prism blocks 19 and 20 are indicated at 27 and 28, respectively.

The light bundle 14 entering face 31 of the upper portion of rear prism plate 18 in Figure 3 is tilted counter-clockwise about the axis of symmetry X—X' of the prism block assembly 19, 20 and 23. The angle of tilt of the entering face 31 indicated in Figure 3 by $\alpha$ will depend upon certain relationships hereinafter more fully set forth. The upper exit face 32 of the front prism plate 17 in Figure 3 is also tilted counter-clockwise from the axis of symmetry X—X'. Here again, the angle of tilt is dependent upon the hereinafter stated relationship.

Referring to the previously described structure, and more specifically to the enlarged fragmentary view shown in Figure 3, the operation of the present invention may best be described by considering its effect upon a bundle of rays 14, which is directed by the reflector 13 at the polarizer device 15.

The bundle of rays 14 will of necessity have a certain deviation from the parallel. This angular deviation in air has been designated by $\delta$. The deviation $\delta$ will be considered as an angular deviation in air above and below an axis of symmetry, indicated at A in Figure 3, and the total angular deviation of the ray bundle above and below X—X' in air is equal to $2\delta$.

Employing a material having an index of refraction equal to 2.00, it has been found that by tilting the entering face 31 of the plate 18 counter-clockwise about the axis of symmetry X—X', at an angle $\alpha$ equal to that of the angle of deviation $\delta$ of the entering ray bundle 14 within the medium, the said bundle of rays will be bent counter-clockwise in the upper prism shown in Figure 3 by an amount $$\frac{\alpha}{2}=\frac{\delta}{2}$$

sufficient to lead them through the polarizer 15 in the desired manner. As shown in Figure 3, the bundle of rays 14 which enters the polarizer 15, is bent upwardly by reason of the tilt $\alpha$ of the entering face 31 from the vertical.

As previously stated, for the example chosen, the angle $\alpha$ has been chosen equal to the angle $\delta$, hence the total ray bundle deviation in air is also $=2\alpha$.

The deviation of a ray bundle of light in a medium having an index of refraction, $n$, is equal to the deviation of a ray bundle of light in air divided by, $n$. That is, if $\delta'$=deviation of the ray bundle 14 in a medium having an index of refraction, $n$, then; for $n=2.00$ $$\delta'=\frac{\delta}{n}=\frac{\delta}{2.00}$$

The bundle of rays within the prism plate 18 therefore has a total angular spread $$2\delta'=\frac{2\alpha}{2}=\alpha$$

Reflection reducing coatings 38 are provided on the surfaces 31, 22, of the prism plate 18 and on the entering surface 37 of the prism blocks 19, 20, as well as upon the exit face 32, of the prism plate 17.

The bundle of rays 14, passing through the prism plate 18, traverses the reflection reducing coating 38 on the surface 22 of the plate 18 with a minimum loss of light. The rays are bent as they pass across the air space 25, and are again bent when they traverse the reflection reducing coating 38 on the surface 37 of the prism block 19. The said rays are directed in a path through the prism block 19, such that all of the elements in the bundle of rays 14, for which some component of the incident ray is transmitted, fall within an angle to the normal to the surface 27 designed by $\tau$. The angle $\tau$ for a material having an index of refraction of $n$ is by definition equal to $$\operatorname{Sin}^{-1}\frac{1}{n}$$

or for $n=2$, $\tau$ is equal to 30°. At angles of incidence greater than $\tau$, the incident rays would be totally reflected.

A portion of the bundle of rays 14ª indicated by the cross hatched area in Figure 3, will traverse the titanium dioxide coatings 26, 27 and emerge from the front prism plate 17 as transmitted rays T, which fall below the axis of symmetry B, of the beam, as indicated by the lower hatched portion thereof. The remaining portion of the bundle of rays 14ª will be reflected from the surface of the titanium dioxide coating 27 and will be directed downwardly, with the same angular spread of $\alpha$ as the incident rays 14, toward the rear face 37 of the lower prism block 20. The reflected component 14ᵇ, as indicated in Figure 3, will traverse the half-wave plate 23 at an angle which will deviate to the extent of from 60° to 60° plus $\alpha$.

Figure 4 illustrates a detailed view of a fragment of the polarizing interfaces and the exit face of the polarizer 15. Certain ray bundles are shown emerging from exit face 32 of the polarizer 15. The upper ray bundle illustrates transmitted rays T, T', emerging from the exit face 32. The lower bundle of rays illustrates the behavior of refluxed rays R, R', emerging from the face 32 of the polarizer 15. It is to be understood that the showing of separate transmitted and refluxed rays is merely for the sake of clarity and that in operation of the polarizing device both transmitted and refluxed rays may emerge from identical points on the exit face and overlap one another.

The bundle of rays 14ª', after refraction at surface 32 emerges as ray bundle T with a total deviation of $2\alpha=2\delta$ below the axis of symmetry X—X'. The manner of refraction may be traced by referring to rays marked with the same number of arrows shown in the drawing. In a similar manner the lower outer face 32' contributes a component indicated at T' in Figure 4 with a deviation of $2\alpha=2\delta$ above the axis of symmetry X—X'. The emerging combined ray bundle T+T' will have a spread equal to $2\delta+2\delta$ or $4\delta$.

Referring now to the lower bundle of rays shown in Figure 4 which illustrates the refluxed component emerging from the face 32 of the polarizer 15, it will be seen that the refluxed component R from the counter-clockwise tilted outer face 32 of the upper outer prism 17 will fall between $+2\alpha=+2\delta$ and the axis of symmetry X—X'.

The refluxed component R' coming from the clockwise tilted outer face of the prism 17 will fall between $-2\alpha = -2\delta$ and the axis of symmetry X—X'.

Thus both the transmitted and refluxed components of light emerge from the exit face 32 with parallel planes of polarization and with the same deviation above the axis of symmetry $X—X' = 2\delta$. The exit beam will be seen to have twice the initial deviation as that of the entrance beam 14, in the horizontal plane and, the same deviation in the vertical plane.

The reflected component 14$^b$ emerges from the polarizing member 15 approximately parallel to the transmitted component T. Parallel disposition of all of the rays makes this embodiment particularly suitable for image projection in which the sidewise displacement of the refluxed component must be kept to a minimum in order to preserve the detail of the projected image. The ability to produce a polarized beam, all the rays of which are substantially parallel, makes the above described structure suitable for 3 dimensional motion picture projection.

Thus a polarizing device made in accordance with this invention produces a beam of polarized light without requiring the light to traverse a light absorbing filter with the result that a greater amount of illumination is available at the surface of the projection screen.

Where light polarizing structures such as are herein disclosed are to be used for image transmission, it is necessary that the polarizing structure be made thin compared to the depth of focus of the rear image so that the polarizer is made part of the lens train. Figure 7 illustrates such a transmission system in which the arrows indicate the image and L$^1$ and L$^2$ the lens system.

Referring now to the showing of Figures 2 and 3, in the drawings the choice of prisms close to the 60° equilateral triangle is necessary so that the reflected components be approximately parallel to the sides of the prism. If they were not so parallel some of the rays would fall outside the opposite faces toward which they are directed and thus be dissipated, thereby reducing the factor of utilization of the reflected component.

Since the base angle of the prism block 19 nearest the entering face in Figures 2, 3 and 4, is selected as $(60+\alpha)°$, the reflected component 14$^b$ will be directed in a path approximately parallel to the entering face of the block 19 toward the bottom prism block 20.

The angle of $(60+\alpha)°$ further causes all of the bundle of the reflected rays 14$^b$ to fall upon the entering face 37 of the prism block 20 at point S, at angles greater than $\tau$; that is, between the angles of $\tau$ and $\tau+\alpha$, and thus all of the rays 14$^b$ are totally internally reflected. After reflection the rays 14$^b$ become 14$^c$ and are directed downwardly at angles between $\delta$ and $2\alpha$ to the X—X' axis and simultaneously the rays 14' are transmitted at point S and lie adjacent to the ray bundle 14$^c$ making downward angles from 0 to $\alpha$ with the horizontal axis X—X'. By reason of the symmetry of the prism structure of the reflected component of the rays 14' will be directed upwardly through the half-wave plate 23 and will reach the surface 27. At the surface 27 the refluxed and transmitted components will behave in the manner previously set forth, in connection with the lower portion of the structure in Figure 2.

Because the entering surfaces 37 of prism blocks 19 and 20 have been tilted slightly out of parallelism with the exit surfaces 40 of the prism blocks 19 and 20, by an angle equal to $\alpha$, the refluxed ray bundle 14$^c$ is bent downward through an angle of $2\alpha$ with reference to the initial direction of ray bundle 14$^a$. Thus ray bundle 14$^a$ has a direction upward toward the axis X—X' varying from the angle 0 to the angle $\alpha$; whereas the refluxed ray bundle 14$^c$ has a downward direction from the X—X' axis of between $\alpha$ and $2\alpha$. The refluxed ray angles lie adjacent to the transmitted portion of the ray bundle 14' which was transmitted through the same point S, from which ray bundle 14$^b$ was refluxed, ray bundle 14' being directed downward from the X—X' axis between the angles of 0 and $\alpha$. When the reflected ray 14$^b$ leaves the titanium dioxide coated surface 27, its plane of polarization is at right angles to that of the plane of polarization of the transmitted portion T of the entering bundle of rays 14. Thus, if the transmitted portion T is polarized vertically with respect to the plane of the paper, as indicated by the dots in Figure 3, the reflected component 14$^b$ will be polarized horizontally, as indicated by the spaced groups of parallel lines. After the reflected component 14$^b$ traverses the half-wave plate 23, its plane of polarization is rotated 90°, and coincides with that of the transmitted portion T of the ray 14$^a$. The rotated reflected bundle of rays impinge upon the surface 37 of the prism block 20 within an angle, the inner extremity of which makes an angle equal to $30°+\alpha°$, with respect to a line N'—N'' drawn normal to the surface 37 and the outer edge of which is at 30° to said normal. Within this angular range all of the incident light will be totally internally reflected and directed toward the front of the prism plate 17. As the totally reflected component 14$^c$ traverses the titanium dioxide coatings 26, 28, it is further subjected to the polarizing effect of the said coatings, and emerges as bundle of rays R' traveling in approximately the same direction as the transmitted rays T and polarized in the same plane. The totally reflected rays 14$^c$, upon leaving the surface 37 of the prism block 20, have a spread equal to $\alpha$. As the rays emerge from the high index medium into air, they have a spread of $2\alpha = 2\delta$.

The point of total internal reflection S may simultaneously be the entering point for another bundle of rays 14', coming from the reflector 13. These rays 14' may, like their corresponding rays 14, be directed through the high index material and a certain portion thereof emerge as part of the beam T'. The incident rays 14', having a deviation of $\delta$ on either side of the axis of symmetry, or a total deviation of $2\delta$, will not coincide with the totally reflected component 14$^c$ of the reflected beam 14$^b$, but will lie adjacent thereto, within the prism block 20.

The rays 14', transmitted in side by side relationship to the totally reflected portion of beam 14$^c$, have a final ray deviation, including T and T' equal to the angle $4\delta$. That portion of the bundle of rays 14' which is not transmitted will, of course, be reflected upwardly through the half-wave plate to the rear surface of the prism block 19 thence toward the front of the polarizer where it emerges as ray bundle R'.

It will thus be seen that for any given point on the rearmost surfaces 37 of the prism blocks 19, 20, light will be at the same time transmitted and totally reflected, both of said beams being made to contribute to the sum total of the bundle of exit rays which are polarized in the same plane. For material having an index of 2.00 and using the titanium dioxide multi-layer polarizers described herein it has been found that if $\delta = \alpha$ is chosen as approximately 3°, then the total spread of the emerging beam is 12° and the initial total beam spread is 6°. Such spread is entirely suitable for such highly critical uses as image projection and all forms of illumination. Other deviations, and corresponding values of prism angle $\alpha$, may of course be chosen.

For materials having different indices of refraction, the angles of the various elements hereabove described, will have to be varied accordingly. Nevertheless, the relationships set forth above between the various elements must be generally maintained in order to achieve the desired result of simultaneous transmission and total reflection within the light polarizing device. These angular relationships can be calculated mathematically by employing the following formulae:

In Figure 3 the example is given in which $n$ (the index of the medium) is equal to 2.00. The upper incident prism face 31 is tilted at an angle $\alpha$ counter-clockwise from the axis of symmetry X—X'. The upper exit prism face 32 makes the angle $2\alpha$ with the vertical also being tilted counter-clockwise from the axis of symmetry X—X'. These conditions are necessary so that the exit beams T—T' have a minimum deviation from the axis of symmetry. In this example the minimum exit beam deviation in the plane of the drawing is twice the initial deviation of the entering beam 14.

In a plane normal to the plane of the drawing, the deviation of the exit beams T—T' and R—R' is equal to the deviation of the entering beam.

The rapid decrease of the angle of refraction $r$ of the refracted beam in the air space 24, for small decreases in the angle made by the incident beam 14 to the normal, is rather remarkable in the vicinity of the angle $\tau$ (see Figure 5). This may be shown by reference to the following derivation:

In Figure 5, $i$=angle of incident ray AB with normal N—N'.

Let: $r$=angle of refraction of refracted ray BC in air.

$\tau = \sin^{-1}\frac{1}{n}$ =angle made with the normal N—N' within which transmission and reflection of the ray AB occurs. For angles greater than $\tau$ total internal reflection occurs:

$$\tau = 30° \text{ for } n=2$$

$\Delta = \tau - i$ then $i = \tau - \Delta = \sin^{-1}\frac{1}{n} - \Delta = 30° - \Delta$ for $n=2$ $$G = 90 - r \text{ then } r = 90 - G$$

But $$\frac{\sin r}{\sin i} = n = 2$$

$$\frac{\sin r}{\sin i} = \frac{\sin(90-G)}{\sin^{-1}(30°-\Delta)} = n = \frac{\cos G}{\sin(30°-\Delta)} = 2$$

$$\sin(30° - \Delta) = \sin 30° \cos \Delta - \cos 30°$$

$$\sin \Delta = \tfrac{1}{2}\cos \Delta - \sqrt{\frac{3}{2}} \sin \Delta$$

For small angles $$\cos G = 1 - \frac{G^2}{2} \cdots$$

$$\sin \Delta = \Delta -$$

Hence $$\frac{1 - \frac{G^2}{2}}{\tfrac{1}{2}\left(1 - \frac{\Delta^2}{2}\right) - \sqrt{\frac{3}{2}}\Delta} = 2$$

$\frac{\Delta^2}{\tau}$ approximates 0 hence $1 - \frac{G^2}{2} = 1 - \sqrt{\frac{3}{2}}\Delta$ $$G = \sqrt{2\sqrt{3}\Delta}$$

This is expressed in radians, expressed in degrees $$G° = \frac{180}{\pi}G \text{ rad and } \Delta° = \frac{180}{\pi}\Delta \text{ rad}$$

This simplifies to:

$$G° = 14.1\sqrt{\Delta°} \text{ for small angles of } \Delta°$$

Putting values into the equation the following table may be computed:

| $\Delta°$ | $G°$ |
|---|---|
| 3.16 | 25. |
| 1 | 14.1 |
| 0.25 | 7.0 |
| 0.16 | 5.6 |
| 0.09 | 1.3 |

For $G°=5.6°$, $\Delta°=0.16$.
For $G°=25°$, $\Delta°=3.16$.

The difference is $3.16-0.16=3°$.

One sees that for rays 0.16° below the axis of symmetry, the refracted ray makes an angle of 5.6° with the surfaces 27 of the multi-layer polarizer, whereas for rays as much as 3.16° below the axis of symmetry the refracted ray makes an angle of 25° to the polarizer surface. Thus, for a variation of only 3° in the angle of the ray bundle the refracted ray varies by approximately 20° in angle.

Thus, the refracted component falls within the range for most efficient polarizing action employing titanium dioxide multi-layer polarizers; that is, 15°±10°. Also, an incident ray bundle 14a having a deviation of 3° corresponds to a value of $\alpha$ equal to 3°, which yields an incident ray deviation of 6°, and an exit ray deviation of 12°, as previously described. Also, the angle $\alpha$ of 3° is relatively small compared to 60°, and thus the equilateral shape of the triangular prism sections 19, 20, is approximately preserved, as required for efficient action, since the entrance angle of $(60+\alpha)°=63°$.

The second embodiment of the present invention, a fragmentary view of which is shown in Fig. 6, is constructed in the manner previously described in connection with the first embodiment, except that the number of polarizing layers has been increased.

As shown in Figure 6, the number of polarizing layers which may comprise coatings of titanium dioxide, have been increased by the interposition of a thin glass plate 50 between the front prism plate 17 and the prism blocks 19, 20. The thin glass plate 50 is provided with coatings of titanium dioxide on each of the surfaces thereof. The surfaces of the prism plate and the prism blocks 19, 20, are also coated with titanium dioxide in the manner previously described.

Air spaces are employed between the coatings on the glass plate 50 and the coatings on the prism plate 17 and prism blocks 19, 20. The glass plate 50 may be made from a material having any index of refraction. Additionally, the glass plate 50 is disposed in parallel relationship to the coated surface of the prism block 17 and the prism blocks 19, 20.

The effect of the increased number of coatings of titanium dioxide upon light transmitted therethrough is to improve the polarizing characteristics of the assembly. It will be apparent that a plurality of glass plates 50, each of which may be coated with a polarizing layer 51, may be interposed between the prism plate 17 and the prism blocks 19, 20, without departing from the spirit of the present invention.

Various other structures may be made within the scope of this invention. For example the entering face angle of 19 and 20 may be held at 60°, and the exit face tilted to $60 - \alpha$ or both exit and entrance faces may be tilted. Various indices of refraction may be assigned to the various elements, and the inner and outer faces may be otherwise tilted or made parallel to obtain various particular effects as will now be apparent to those skilled in this art, but all within the scope of this invention.

It will be apparent that other multi-layer polarizing structures may be substituted for those disclosed above by making suitable changes in the index of refraction of the structure without departing from the spirit of the invention. Certain angular changes in the system may also be required to compensate for other polarizers but in conformity with the relationships set forth herein.

From the foregoing it will be seen that there has been provided a light polarizing device which is particularly suited to vehicle headlight use. The high transmission of the present device represents a very substantial improvement over previously available polarizers such as linear polarizing material which at best absorbs about 60% of the incident light. The use of formerly known polarizers would require an increase of 2.5 times in the lamp candle power in order to restore the illumination to its original level. The shortcomings of these former devices have presented obstacles which have prevented the adoption of the most urgently needed polarized illumination for vehicle use. It will be apparent that an increase of 2.5 in the candle power of present vehicle lights would cause an excessive drain on the battery and overload the car wiring system.

The herein disclosed polarizers may be used in conjunction with the presently supplied headlights without dimming them to a dangerous degree. Moreover, present illumination levels may be maintained by increasing the lamp candle power only a small amount and within the limits of safety and presently used battery capacity.

While the preferred embodiment described above employs a plurality of prism blocks 19 and 20 disposed in front of the light source 11, it is within the purview of the present invention to use only two prism blocks of a size which will cover the entire area of light source. It is to be understood, however, that in employing only two prism blocks 19, 20, the thickness of the final assembly will be greatly increased. For most uses the thicker assembly would be objectionable, in that it would involve greater weight and take up more space. However, in such uses as the projection of light or stationary installations, problems of weight and size may not be material. Conversely, the overall thickness of the polarizing assembly can be substantially decreased by increasing the number of pairs of prism blocks 19, 20, which are inserted between the prism plates 17, 18.

It is to be understood that the structure and operation of the polarizing device remains the same, whether only two or a large number of pairs of prism blocks 19, 20 are employed.

Having thus fully described the invention, what is claimed as new and desired to be secured by Letters Patent of the United States is:

1. A light polarizing device comprising a source of parallel light, a pair of prism blocks each having a triangular cross-section disposed in front of the light source, said paired blocks being positioned with the bases of their triangular sections adjacent one another, a half-wave plate between said bases, a rear prism plate on the light source side of the blocks, a front prism plate on the opposite side of the prism blocks, said front and rear plates having prismatic surfaces thereon which lie adjacent and substantially conform to the shape of the prism block pairs, a multi-layer polarizer between the surfaces of the prism blocks and the front prism plate and tilted exterior surfaces on the prism plates to control the spread of the entering and exit beams of light.

2. A light polarizing device comprising a source of parallel light, a plurality of pairs of prism blocks each having a triangular cross-section disposed in front of the light source, said paired blocks being positioned with the bases of their triangular sections adjacent one another, a half-wave plate between said bases, a rear prism plate on the light source side of the blocks, a front prism plate on the opposite side of the prism blocks, said front and rear plates having prismatic surfaces thereon which lie adjacent and substantially conform to the shape of the prism block pairs, a multi-layer polarizer between the surfaces of the prism blocks and the front prism plate and a plurality of tilted exterior surfaces on the prism plates to control the spread of the entering and exit beams of light.

3. A light polarizing device comprising a source of parallel light, a pair of prism blocks each having a triangular cross-section disposed in front of the light source, said paired blocks being positioned with the bases of their triangular sections adjacent one another, a half-wave plate laminated between said bases, a rear prism plate on the light source side of the blocks, a front prism plate on the opposite side of the prism blocks, said front and rear plates having prismatic surfaces thereon which lie adjacent and substantially conform to the shape of the prism block pairs a multi-layer polarizer between the surfaces of the prism blocks and the front prism plate and tilted exterior surfaces on the prism plates to control the spread of the entering and exit beams of light.

4. A light polarizing device comprising a source of parallel light, a pair of prism blocks each having a triangular cross-section disposed in front of the light source, said paired blocks being positioned with the bases of their triangular sections adjacent one another, a half-wave plate between said bases, a rear prism plate on the light source side of the blocks spaced from said blocks, a front prism plate on the opposite side of the prism blocks, spaced from said blocks, said front and rear plates having prismatic surfaces thereon which lie adjacent and substantially conform to the shape of the prism block pairs, a multi-layer polarizer between the surfaces of the prism blocks and the front prism plate and tilted exterior surfaces on the prism plates to control the spread of the entering and exit beams of light.

5. A light polarizing device comprising, a source of parallel light, a pair of prism blocks each having a triangular cross-section disposed in front of the light source, said paired blocks being positioned with the bases of their triangular sections adjacent one another, a half-wave plate between said bases, a rear prism plate on the light source side of the blocks, a front prism plate on the opposite side of the prism blocks, said front and rear plates having prismatic surfaces thereon which lie adjacent and substantially conform to the shape of the prism block pairs, a polarizing high index of refraction coating on the prismatic surface of the front plate, a polarizing high index of refraction coating on the surfaces of the prism blocks facing the front plate in the form of a multi-layer high index coating and tilted exterior surfaces on the prism plates to control the spread of the entering and exit beams of light.

6. A light polarizing device comprising, a source of parallel light, a pair of prism blocks each having a triangular cross-section disposed in front of the light source, said paired blocks being positioned with the bases of their triangular sections adjacent one another, a half-wave plate between said bases, a rear prism plate on the light source side of the blocks, a front prism plate on the opposite side of the prism blocks, said front and rear plates having prismatic surfaces thereon which lie adjacent and substantially conform to the shape of the prism block pairs, a quarter-wave coating consisting of titanium dioxide on the prismatic surface of the front plate, a quarter-wave coating consisting of titanium dioxide on the surfaces of the prism blocks facing the front plate in the form of a multi-layer high index coating and tilted exterior surfaces on the prism plates to control the spread of the entering and exit beams of light.

7. A light polarizing device comprising a source of parallel light, a pair of prism blocks formed of a transparent material having a high index of refraction, each having a triangular cross-section disposed in front of the light source, said paired blocks being positioned with the bases of their triangular sections adjacent one another, a half-wave plate between said bases, a rear prism plate formed of a transparent material having a high index of refraction on the light source side of the blocks, a front prism plate formed of a transparent material having a high index of refraction on the opposite side of the prism blocks, said front and rear plates having prismatic surfaces thereon which lie adjacent and substantially conform to the shape of the prism block pairs, a multi-layer polarizer between the surfaces of the prism blocks and the front prism plate and tilted exterior surfaces on the prism plates to control the spread of the entering and exit beams of light.

8. A light polarizing device comprising a source of parallel light, a pair of prism blocks each having a triangular cross-section disposed in front of the light source, said paired blocks being positioned with the bases of their triangular sections adjacent one another, a half-wave plate between said bases, a rear prism plate on the light source side of the blocks, a front prism plate on the opposite side of the prism blocks, said front and rear plates having prismatic surfaces thereon which lie adjacent and substantially conform to the shape of the prism block pairs, a high index coating on the prismatic surface of the front plate, a high index coating on the surfaces of the prism blocks facing the front plate, a reflection reducing coating on all surfaces not coated with the quarter-wave coating, a multi-layer polarizer between the surfaces of the prism blocks and the front prism plate and tilted exterior surfaces on the prism plates to control the spread of the entering and exit beams of light.

9. A light polarizing device comprising a source of parallel light, a pair of prism blocks each having a triangular cross-section disposed in front of the light source, said paired blocks being positioned with the bases of their triangular sections adjacent one another, a half-wave retardation plate between said bases, a rear prism plate on the light source side of the blocks spaced from said blocks, a front prism plate on the opposite side of the prism blocks spaced from said blocks, said front and rear plates having prismatic surfaces thereon which lie adjacent and substantially conform to the shape of the prism block pairs, a high index coating on the prismatic surface of the front plate, a high index coating on the surfaces of the prism blocks facing the front plate, a transparent plate between the front plate and prism blocks, a high index coating consisting of titanium dioxide on each surface of said transparent plate, a multi-layer polarizer between the surfaces of the prism blocks and the front prism plate and tilted exterior surfaces on the prism plates to control the spread of the entering and exit beams of light.

10. A light polarizing device comprising a source of parallel light, a pair of prism blocks each having a substantially triangular cross-section disposed in front of the light source, said paired blocks being positioned with the bases of their triangular sections adjacent one another, a half-wave retardation plate between said bases, a rear prism plate on the light source side of the blocks spaced from said blocks, a front prism plate on the opposite side of the prism blocks spaced from said blocks, said front and rear plates having prismatic surfaces thereon which lie adjacent and substantially conform to the shape of the prism block pairs, a quarter-wave coating consisting of titanium dioxide on the prismatic surface of the front plate, a quarter-wave coating consisting of titanium dioxide on the surfaces of the prism blocks facing the front plate, a transparent plate between the front plate and prism blocks, said coated surfaces comprising a multi-layer polarizer, a quarter-wave coating consisting of titanium dioxide on each surface of said transparent plate and tilted exterior surfaces on the prism plates to control the spread of the entering and exit beams of light.

11. A light polarizing device comprising, a source of parallel light, a pair of prism blocks each having a substantially equi-angular triangular cross-section disposed in front of the light source, said paired blocks being positioned with the bases of their triangular sections adjacent one another, a half-wave retardation plate between said bases, a rear prism plate on the light source side of the blocks, a front prism plate on the opposite side of the prism blocks, said front and rear plates having prismatic surfaces thereon which lie adjacent and substantially conform to the shape of the prism block pairs, a multi-layer polarizer between the surfaces of the prism blocks and the front prism plate and tilted exterior surfaces on the prism plates to control the spread of the entering and exit beams of light.

12. A light polarizing device comprising, a source of parallel light, a pair of prism blocks formed of a transparent material having a high index of refraction, each having a triangular cross-section disposed in front of the light source, the base angle on the light source side being 63° and the base angle on the exit side of the prism being 60°, said paired blocks being positioned with the bases of their triangular sections adjacent one another, a half-wave plate between said bases, a rear prism plate formed of a transparent material having a high index of refraction of the order of 2.00 on the light source side of the blocks, a front prism plate formed of a transparent material having high index of refraction of the order of 2.00 on the opposite side of the prism blocks, said front and rear plates having prismatic surfaces thereon which lie adjacent and substantially conform to the shape of the prism block pairs, a multi-layer polarizer between the surfaces of the prism blocks and the front prism plate and tilted exterior surfaces on the prism plate to control the spread of the entering and exit beams of light.

13. A light polarizing device comprising, a source of parallel light, a pair of prism blocks formed of a transparent material having a high index of refraction of the order of 2.00, each having a triangular cross-section disposed in front of the light source, the base angle on the light source side being of the order of 63° and the base angle on the exit side of the prism being 60°, said paired blocks being positioned with the bases of their triangular sections adjacent one another, a half-wave retardation plate between said bases, a rear prism plate formed of a transparent material having a high index of refraction of the order of 2.00 on the light source side of the blocks, a front prism plate formed of a transparent material having a high index of refraction of the order of 2.00 on the opposite side of the prism blocks, said front and rear plates having prismatic surfaces thereon which lie adjacent and substantially conform to the shape of the prism block pairs and tilted exterior surfaces on the rear and front prism plates to control the spread of the entering and exit beams of light, said tilt being of the order of 3° and 6° respectively, from the vertical.

14. A device according to claim 7, in which the entering faces of the inner prism plate are tilted at an angle $\alpha°$ to the plane of the plate, the face of the prism blocks on the inner side is tilted at an angle (60 plus $\alpha°$) to the beam axis, the face of the prism blocks on the exit side is tilted at an angle 60° to the beam axis, and the exit faces of one outer prism plate are tilted at an angle of $2\alpha°$ to the plane of the outer prism plate.

15. A device according to claim 7, in which the inner and outer prism plates and the prism blocks have an index of refraction of the order of 2.00.

References Cited in the file of this patent

UNITED STATES PATENTS

| | | |
|---|---|---|
| 1,963,127 | Gardner | June 19, 1934 |
| 2,392,978 | Dimmick | Jan. 15, 1946 |

FOREIGN PATENTS

| | | |
|---|---|---|
| 460,666 | Great Britain | Jan. 28, 1937 |
| 918,102 | France | Oct. 7, 1946 |
| 707,060 | Great Britain | Apr. 14, 1954 |